United States Patent [19]
De Grella, Jr. et al.

[11] 3,766,973
[45] Oct. 23, 1973

[54] CONTROL CIRCUIT FOR HEATING AND COOLING APPARATUS

[75] Inventors: Richard J. De Grella, Jr., Paul D. Schrader, both of Louisville, Ky.

[73] Assignee: General Electric Company, Louisville, Ky.

[22] Filed: Mar. 15, 1972

[21] Appl. No.: 234,714

[52] U.S. Cl. .................................................. 165/26
[51] Int. Cl. ........................................... F25h 29/00
[58] Field of Search ................ 165/26, 39, 40, 27, 165/22, 25

[56] References Cited
UNITED STATES PATENTS
3,242,978   3/1966   McCann ............................. 165/25

Primary Examiner—Charles Sukalo
Attorney—Walter E. Rule et al.

[57] ABSTRACT

Control circuitry for controlling the operation of multiple-speed fan means in a combination refrigeration cooling and electrical heating system includes a multiple-pole, double-throw relay for selecting the heating and cooling modes of operation, the operation of the relay being controlled through the electrical heating means.

6 Claims, 1 Drawing Figure

PATENTED OCT 23 1973          3,766,973
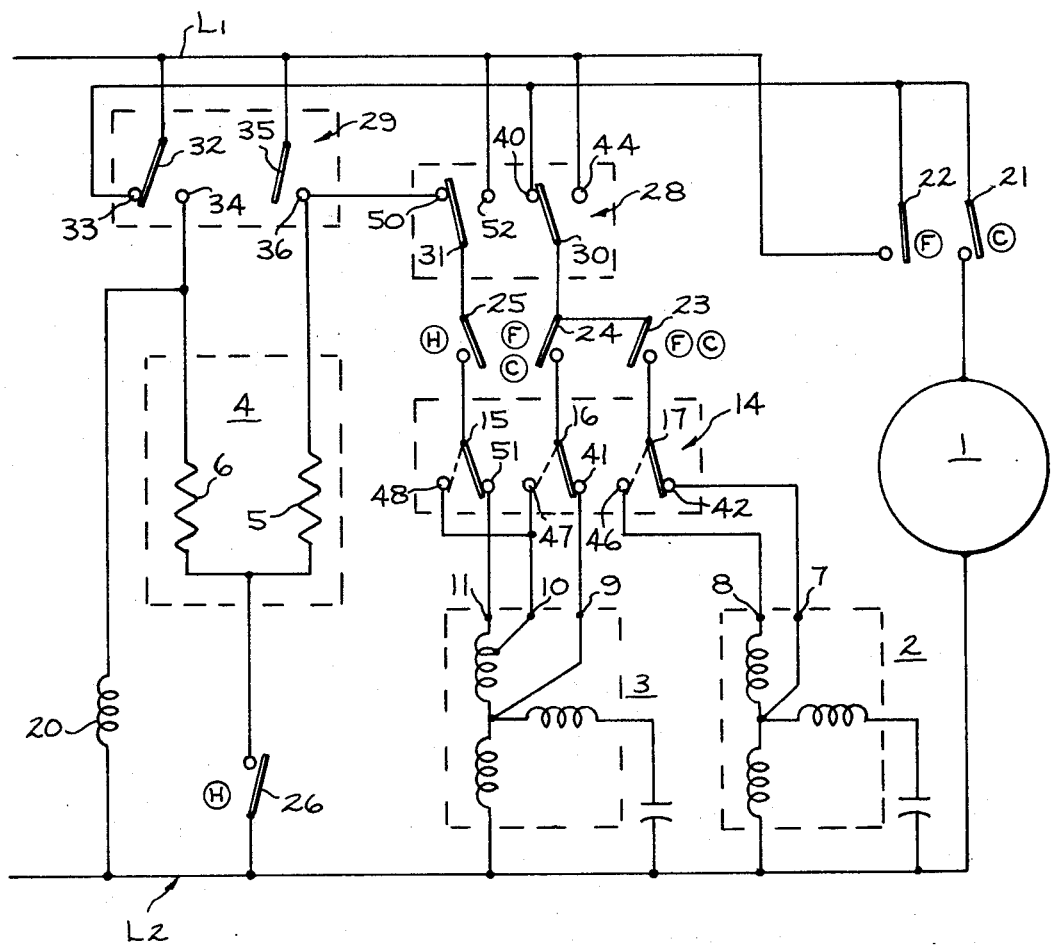

3,766,973

CONTROL CIRCUIT FOR HEATING AND COOLING APPARATUS

BACKGROUND OF THE INVENTION

The present invention is generally concerned with air cooling and heating apparatus of the unitary type, that is, of the type in which refrigeration cooling and electrical heating components are contained within a single casing or housing divided by a partition into indoor and outdoor sections. The evaporator component of the refrigeration cooling means and the resistance heating means, along with an indoor fan for circulating enclosure air, are contained within the indoor section while the outdoor section contains the compressor, condenser and outdoor fan components. Manually operated switch means are provided on the unit for selecting the heating, cooling or ventilating, i.e., air-circulating, modes of operation while thermostat means automatically control the energization of the refrigeration system and electrical heaters in accordance with enclosure temperature requirements.

In known units of this type, the control circuitry has included separate relays for connecting the thermostat control through the manually operated switch means to the air-circulating fan or fans for selectively providing the desired fan speed for operation of the unit in either the heating, cooling or air-circulating modes. The present invention is directed specifically to an improved control circuitry eliminating the separate relays and providing circuit means whereby the fans operation can be controlled by a single relay.

SUMMARY OF THE PRESENT INVENTION

The control circuitry of the present invention is part of an air conditioning unit comprising the combination of a refrigeration cooling system and an electrical heating system and multiple-speed fan means for circulating air over the cooling and heating components. The heating component includes first and second electrical resistance heaters forming a two-stage heating system. In addition to a switch means for manually selecting operation of the system in either a cooling, heating or air-circulating mode and a thermostat for automatically controlling the energization of one or both of the heaters or of the refrigeration system, the control circuitry includes a single relay including a multiple-pole, double-throw switch means for selecting an operating speed of the air-circulating fan means in each of the various operating modes. The relay coil is operated by the thermostat and through the electrical resistance heaters in such a manner that the desired fan speed is obtained under each of a number of operating conditions.

BRIEF DESCRIPTION OF THE DRAWING

In the accompanying drawing the single Figure is a schematic diagram of a control circuit embodying the present invention.

DESCRIPTION OF THE PREFERRED EMBODIMENT

The circuitry of the present invention is designed to control, from a pair of power supply lines L1 and L2, the operation of a combination refrigeration cooling and electrical heating system. The refrigeration system is of the usual type including a compressor 1, a condenser and an evaporator (not shown) in closed series connection. A condenser or outdoor fan 2 circulates outdoor air over the condenser and compressor while an indoor or evaporator fan 3 circulates enclosure or indoor air over the cooling evaporator and also a two-stage heater 4. The heater 4 comprises a first electric resistance heater 5 energized for low heat and a second electric resistance heater 6 connected in parallel with the first heater 5 for high-heat operation.

The outdoor fan 2 is a two-speed fan including a high-speed terminal 7 and a low-speed terminal 8 while the indoor fan 3 is a three-speed fan including a high-speed terminal 9, a medium-speed terminal 10 and a low-speed terminal 11, these various speeds providing appropriate air flows under certain cooling, heating and air-circulating conditions.

The selection of fan speeds is obtained through a single relay switch generally indicated by the numeral 14, this relay switch being of the multiple-pole, double-throw type and including a heating switch means 15 and a cooling switch means 16 for controlling the speed for the indoor fan 3 and also a switch 17 for controlling the speed of the outdoor or condenser fan 2. The relay 14 also includes a relay or operating coil 20.

Manual control of the operation of this cooling and heating system is provided in the form of a gang switch comprising a plurality of mechanically interconnected switches adapted to operate the components of the apparatus in either the cooling mode, the heating mode or air-circulating mode in which the compressor 1 is not energized. These switches include a compressor switch 21, a fan switch 22 for air circulation without heating or cooling, fan and cooling switches 23 and 24 and heating switches 25 and 26. All of these switches are illustrated in their "off" or open positions with the circulated letters H, C or F adjacent each of the switches indicating those switches which are closed manually for the heating, cooling or fan (air circulation) modes.

A manually operated fan-cycle switch 28 provides means for operating the fans 2 and 3 either continuously or cycling under control of a thermostat 29. Specifically, the fan or cycle switch 28 includes two separate switches, the switch 30 functioning generally during cooling operation and the switch 31 during heating operation.

The thermostat 29 includes a first temperature-responsive switch means 32 having a cooling contact 33 and a heating contact 34, and a second temperature-responsive switch 35 having a contact 36. Switch 32 is designed so that either contact 33 or 34 is engaged under all conditions. The contact 36 is a low-heat or cooling, i.e., moderate temperature, contact that also connects the first heater 5 across lines L1, L2 through the manual heat switch 26 to provide a first or low-stage heating under moderate heat requirement conditions. The heating contact 34 of the thermostat switch 32 connects the second-stage heater 6 across lines L1, L2 through the heater switch 26 under maximum heat requirement conditions. Both switches 32 and 34 are adjustable but interconnected with an operating temperature difference such that low-heat switch 35 closes at a higher sensed temperature than switch 32. In other words, switch 32 does not make heating contact unless the sensed heating requirement is not satisfied by heater 5 controlled by switch 35.

In accordance with the present invention, the energization of the relay coil 20, and hence the speed of the fans, is controlled by the thermostat switches in combination with the heaters 5 and 6. When the contact 34 is closed, the coil 20 is connected directly across lines L1 and L2 and is in parallel connection with the second-stage heater 6. If heater switch 26 is closed, both of the heaters are energized since the contact 36 is also closed. If thermostat contact 34 and switch contact 26 are open and contact 36 closed, the coil 20 is energized through the heaters 5 and 6 in series. Thus, a single, multiple-pole relay can be employed in place of a plurality of separate relays respectively controlled by the thermostat switches for obtaining the desired fan speeds in the three modes of operation of the system, as will become more evident from a consideration of the control of the system in its various modes of operation.

Considering first the operation of the control circuitry when the gang switches are in their cooling position, the fan switches are in the fan cycle position and all of the relay switches are in the illustrated solid line or de-energized positions. The compressor is connected across the lines through the thermostat cool contact 33 and manual switch 21, while the fan circuits include the fan-cycle contact 40 of the fan cycle switch 30, the closed manual switches 23 and 24, contacts 41 and 42 of relay switches 16 and 17, and terminals 9 and 7 of the respective fans 3 and 2, so that both fans 2 and 3 are operating at their maximum speeds. The fans and compressor will cycle under control of the thermostat switch 32. Continuous fan operation with cycling of the compressor only can be obtained by switching the fan cycle switch whereby switch 30 makes contact with the continuous fan contact 44. The thermostat cooling contact 33 then controls only the compressor cycling.

Assume now that the temperature of the enclosure decreases to the point that the thermostat switch 33 is still closed and switch 35 closes, calling for moderate heating or moderate cooling, i.e., a moderate temperature. The relay coil 20 will be connected across the lines L1 and L2 through the thermostat contact 36 and the resistance heaters 5 and 6 in series since the heater switch 26 is open. Energization of the relay coil 20 then moves the various relay switches from their first or de-energized positions to their second or energized positions, shown in dotted lines, so that switch 17, through contact 46 connected to the outdoor fan terminal 8, operates the outdoor fan at a low speed and switch 16, through contact 47 connected to indoor fan terminal 10, operates the indoor fan at medium speed thereby decreasing the indoor air circulation to a more comfortable level. The switch 15 also engages contact 48 but no current flows since the manual heating switch 25 is open. In this operating mode, the fan speeds cycle under the control of the thermostat warm contact 36, and the compressor is controlled by contact 33. If the fan cycle switch is switched to continuous operation, the fans 2 and 3 will operate continuously at speeds selectively controlled through thermostat contact 36 and relay 14, and the compressor wil cycle under control of the thermostat cooling contact 33. Whenever the enclosure becomes too warm, contact 36 will be opened and the system returned to its maximum cool operation.

When the manual or gang switches are in their cooling positions but the thermostat calls for maximum heat so that both contacts 34 and 36 are made, relay 20 will be connected directly across lines L1, L2 through contact 34 to move the relay switches to their energized positions. If the fan-cycle switch is on cycle operation, cycle switch 31 will be in engagement with contact 50 and switch 30 in engagement with contact 40 but the fans cannot be energized through these circuits since the manual switch 25 is open and the cold contact 33 of the thermostat is not made. Accordingly, the fans, heaters, and compressor are all denergized. However, if the fan-cycle switch is in the continuous position, the fan cycle switch 30 by engagement with contact 44 connects the fans directly across the lines L1 and L2 in the energized position of the relay switches 16 and 17. The indoor fan 3 will operate at medium speed and the outdoor fan at low speed.

Under these enclosure temperature conditions, the coocupant will normally close the manually operated heating switches 25 and 26 thereby opening switches 21, 22, 23 and 24. Both of the heaters 5 and 6 will then be energized through the manual heating switch 26 and the respective thermostat contacts 36 and 34, while the indoor fan 3 will be operated at medium speed through the relay contact 48, switch 25 and the fan cycle switch contact 50. The outdoor fan and compressor are deenergized. The indoor fan and heaters will cycle under control of the thermostat on either continuous or fan-cycle switch positions so long as contact 36 is made. If the heating requirements become moderate, so that heating contact 34 is opened to de-energize the second-stage heater 6, the relay coil 20 will also be deenergized since the coil is shunted by the closed heating switch 26. With the relay returned to its de-energized position, the indoor fan 3 will continue to operate at low speed by energization through contact 51 of relay switch 15 and low-speed terminal 11. Similarly, the indoor fan will operate continuously at a low speed if the fan-cycle switch is in continuous position. If contact 36 is also opened, the heaters and indoor fan are both de-energized on fan cycle operation but the fan will continue to operate at low speed on the continuous fan-cycle switch position through contact 52.

Closing of the manually operated fan switches 22, 23 and 24, thereby opening switches 21, 25 and 26, deenergizes the heaters and compressor. The fan speeds are, however, controlled by the thermostat and relay 14. In other words, in either position of the relay switches, the fans are energized either by direct connection to line L1 or through fan switch 22. If the fan switches are in cycle position and the thermostat calls for maximum heating with both of the contacts 34 and 36 made, or for moderate heating or cooling with only the contact 36 made, the relay coil 20 will be energized and switches 16 and 17 will be in their energized positions to operate the indoor fan 3 on medium speed through contact 41 of switch 16 and the outdoor fan 2 on low speed through contact 46 of switch 17. If the thermostat calls for maximum cooling, opening of both of the heating contacts 34 and 36 will de-energize the relay 20, switching the relay switches to their de-energized positions, thereby operating the indoor fan at high speed for maximum air circulation through the contact 41 of relay switch 16 and operating the outdoor fan 2 at its maximum speed through the contact 42 of the switch 17.

It may be noted that the reason for operating the outdoor fan under these and other conditions is that in many air conditioning units vent means are provided for exchanging indoor and outdoor air through the partition separating the indoor and outdoor components of the unit. Operation of the outdoor fan aids in this air exchange.

When the fan-cycle switch is in continuous position and the fan manual switches are closed, the fan speeds are still controlled by the thermostat, the energizing circuits including continuous fan contact 44 of the fan-cycle switch 30. With the thermostat calling for low-heat or cooling or maximum heat, relay switches 16 and 17 are in their energized positions to operate the indoor fan 3 at medium speed and the outdoor fan at low speed. Under maximum cool thermostat operation, the relay 14 is in its de-energized position and both fans operate at their high speeds.

From the above description, it will be seen that by the present invention employing a single relay, there is provided a low-cost circuitry for furnishing a multiplicity of cooling, heating and air-circulating functions and in which a thermostat controls the compressor operation, the heater operation and, in conjunction with the relay, the speeds of the fan motors under a variety of operating conditions. The fan-cycle switch selects either the fan motors cycling with the compressor or heaters or the fan motors running continuously and independently of the heater or compressor energization, and the single relay 14, by being controlled either directly by the thermostat or through the heaters, controls the speed of the fan motors to give the optimum air flow under each condition of operation.

While there has been shown and described a specific embodiment of the present invention it will be understood that it is not limited thereto and it is intended by the appended claims to cover all such modifications as fall within the true spirit and scope of the invention.

We claim:

1. A control circuitry for controlling the operation, from a pair of power supply lines, of a multiple-speed fan for circulating enclosure air in a combination refrigeration cooling and electrical heating system in which the heating component includes first and second electrical resistance heaters comprising:
   a multiple-switch relay including a relay coil and a plurality of switch means for selecting the operating speed of said fan and movable from a first position to a second fan speed control position upon energization of said coil;
   a thermostat including first termperature-responsive switch means having a cooling contact and a high-heat contact connected to said second resistance heater and a second temperature-responsive switch means having a low-heat or cooling contact connected to said first resistance heater;
   manually-operated, multiple-switch means having a cooling and a heating position and including a heater switch and a cooling switch interconnected for alternative closing of said heater switch or said cooling switch;
   circuits for connecting said resistance heaters and relay coil to said power lines comprising a first heater circuit including said low-heat contact, said first heater and said heater switch in series connection, a second heater circuit including said high-heat contact, said second resistance heater and said heater switch in series connection, a first relay coil circuit including said high-heat contact and said relay coil in series, a second relay coil circuit series connecting said low-heat contact, first resistance heater, second resistance heater and said coil for energizing said relay coil when said heater switch is open.

2. Control circuitry according to claim 1 including switch means for continuously operating said fan.

3. Control circuitry according to claim 1 in which said system includes both an enclosure air fan and an outdoor fan and said relay also includes switch means controlling the speed of the outdoor fan.

4. A control circuitry for controlling the operation, from a pair of power supply lines, of a multiple-speed fan for circulating enclosure air in combination refrigeration cooling and electrical heating system including first and second electrical resistance heaters comprising:
   a multiple-pole, double-throw relay including a relay coil and a switch means for selectively controlling the operating speed of said fan and movable from a first fan-speed position to a second fan-speed position upon energization of said coil;
   a thermostat including first termperature-responsive switch means having a cooling contact and a high-heat contact connected to said second resistance heater and a second temperature-responsive switch means having a moderate termperature contact connected to said first resistance heater;
   a gang switch having a cooling and a heating position and including first and second heater switches and cooling switches interconnected for alternative closing of said heater switches or said cooling switch, said first heater switch in the heating position connecting said relay heating switch means to said thermostat moderate temperature contact and said second heater switch connecting both of said heaters in parallel to one of said supply lines, said cooling switch connecting said thermostat cooling contact to said relay cooling switch means;
   circuits for connecting said resistance heaters and relay coil to said power lines comprising a first heater circuit including said low-heat contact, said first heater and said first heater switch in series connection, a second heater circuit including said high-heat contact, said second resistance heater and said first heater switch in series connection, a first relay coil circuit including said high-heat contact, and said relay coil and a second relay coil circuit series connecting said moderate temperature contact, first resistance heater, second resistance heater and said coil for energizing said relay coil when said first heater switch is open;
   whereby when said first and second heater switches are open and said cooling switch is closed, closing of said moderate temperature contact energizes said coil and positions said relay switch means in its second position to operate said fan on a cooling fan speed, closing of said heater switches de-energizes said relay coil and completes the first heater circuit, and subsequent closing of said thermostat high-heat contact re-energizes said relay coil and connects said heaters in parallel across said supply lines.

5. Control circuitry according to claim 4 for controlling a system including both an enclosure air fan and an outdoor fan and said relay includes switch means controlling the operation of said outdoor fan.

6. Control circuitry according to claim 4 including switch means for either cycling said fan under control of said thermostat or continuously operating said fan.

* * * * *